Sept. 19, 1967 W. J. HUNGERFORD ETAL 3,341,977
CONFORMING POLISHER FOR ASPHERIC SURFACES OF REVOLUTION
Filed Feb. 12, 1965 2 Sheets-Sheet 1

FIG.I.

INVENTORS
William J. Hungerford
John W. Larmer &
Maurice Levinsohn
BY
ATTORNEYS

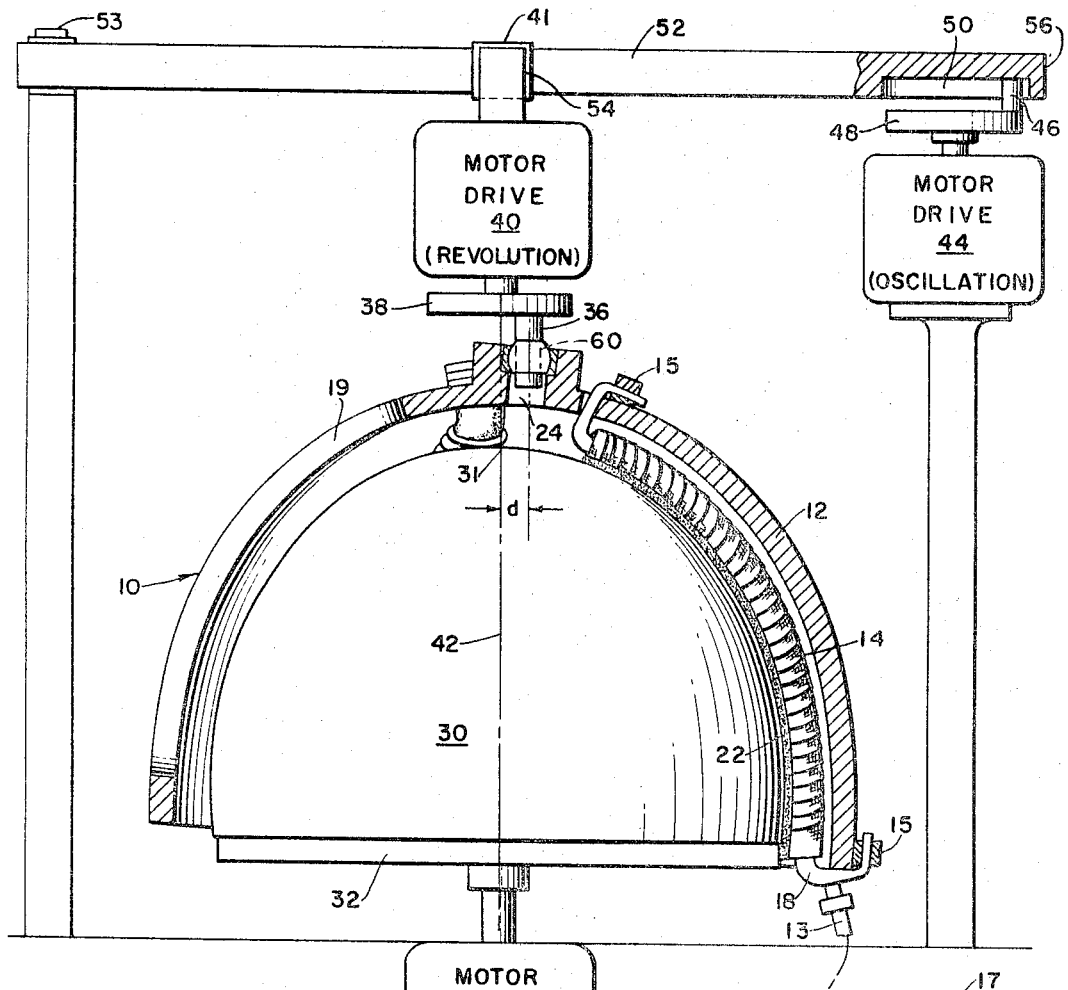
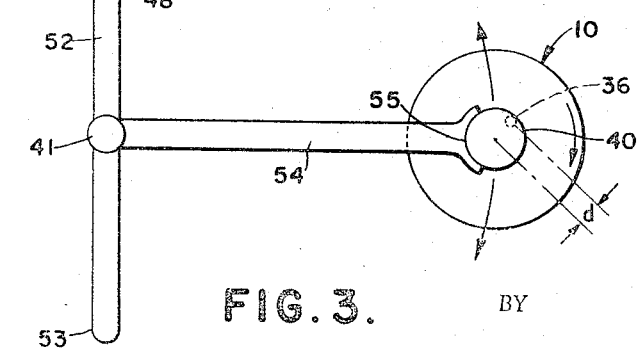
FIG. 2.
FIG. 3.
INVENTORS
William J. Hungerford
John W. Larmer &
Maurice Levinsohn
ATTORNEYS United States Patent Office 3,341,977
Patented Sept. 19, 1967

3,341,977
CONFORMING POLISHER FOR ASPHERIC
SURFACES OF REVOLUTION
William J. Hungerford, Bowie, Md., John W. Larmer, Arlington, Va., and Maurice Levinsohn, Annapolis, Md., assignors to the United States of America as represented by the Administrator of the National Aeronautics and Space Administration
Filed Feb. 12, 1965, Ser. No. 432,433
6 Claims. (Cl. 51—57)

ABSTRACT OF THE DISCLOSURE

A conforming polisher for an aspheric surface of revolution, the polisher including inflatable tube means for applying polishing compound with a uniform pressure to the surface to be polished.

The invention described herein may be manufactured and used by or for the Government of the United States of America for governmental purposes without the payment of any royalties thereon or therefor.

This invention relates to a polisher for a surface of revolution and more particularly to a conforming polisher which produces an optical finish on a surface of revolution having a high degree of asphericity.

Aspheric surfaces, i.e., surfaces that are not completely spherical, are widely used in optical instruments. For example, aspheric lenses are used in Schmidt cameras as corrector plates because the light waves normal to a given aspheric wave surface can be reflected by the aspheric surface such that the reflected waves are normal to any desired wave surface. However, aspheric surfaces, while desirable in optical applications, are difficult to manufacture and usually require polishing by hand. These difficulties are not encountered with completely spherical contours because a surface possessing such a high degree of symmetry allows for the use of well known mechanical grinding apparatus. However, as a surface of revolution deviates from spherical symmetry, that is becomes aspheric, grinding and especially polishing with a uniform application of pressure become major limitations in the effective construction of aspheric surfaces of revolution in optical instrumentation.

A particular application for surfaces of revolution having a high degree of asphericity was noted in connection with attempts to simulate solar conditions in ground testing of earth satellites. In order to manufacture a large quantity of aspheric metallic reflectors, for high intensity light sources to simulate solar radiation, reflectors were replicated from a stainless steel ellipsoidal master. The master, which is machined by numerical tape control to an extremely high accuracy, must be polished to an optical finish by a process which does not affect contour accuracy. Therefore, it is essential that uniform pressure be applied to each portion of the aspheric surface of revolution, i.e., the master, in polishing to an optical finish. (Also the polishing technique is useful in removing scratches on the master which result from the act of separating the electroform reflectors from the master.) Thus, it is necessary to utilize a method of polishing which provides high optical quality without degrading surface contour accuracy.

There have been various attempts in the past to polish generally spherical surfaces to a high optical finish, usually by means of a polishing element or body which is shaped to conform to the spherical contour. One such technique is illustrated in the United States Patent No. 3,050,909 issued August 28, 1962, which discloses a method for polishing by relative rotation and oscillation of the generally spherical surface of revolution with respect to the polishing element. As previously stated, in some applications it is necessary that the polishing process take place without degrading surface contour accuracy, and this necessarily means that uniform pressure must be applied to each portion of the surface to be polished. Some prior art devices are capable of applying uniform pressure if the surface of revolution is spherical; however, a workable mechanical method of polishing metallic surfaces of revolution having a high degree of asphericity to a high optical finish while simultaneously applying uniform pressure to the surface throughout the polishing process has not yet been developed.

Accordingly, it is an object of this invention to provide an improved conforming polisher which applies uniform pressure throughout the polishing process.

It is a further object to provide a conforming pneumatic polisher which is shaped to conform to the contour of an aspheric surface of revolution.

It is yet another object of this invention to provide a machine which is capable of imparting two different modes of motion to a conforming polisher while at the same time rotating an aspheric surface of revolution about its axis of revolution so as to provide a random path for an element on the polisher with respect to a particle on the surface of revolution.

It is yet further an object of this invention to provide an improved method of randomizing the path of a polishing particle on a conforming polisher with respect to a particle on an aspheric surface of revolution.

The above objects are achieved by an improved polishing machine which, while rotating an aspheric surface of revolution about its axis by means of a mandrel, simultaneously revolves the vertex of a conforming polisher which is shaped to conform to the aspheric surface of revolution, in a circular path. The plane of the circular path is perpendicular to the axis of the rotating mandrel, and the center of the path, due to the revolution of the vertex, corresponds to the axis of the surface of revolution which is to be polished. The vertex of the polisher at the same time is oscillated back and forth in a substantially straight line within a curved plane. The degree of curvature of this plane is determined by the general curvature of the surface of revolution near its vertex. As a result of the three modes of motion (i.e., rotation by a mandrel, revolution and oscillation) a polishing particle on the conforming polisher possesses a random path with respect to any particle on the surface of revolution.

Also, the above objects are achieved by the use, in connection with the polishing machine, of a novel conforming polisher comprising a body generally shaped to the contour of an aspheric surface of revolution which is to be polished. The inner periphery of the body is lined with a series of polishing elements which include inflatable tubes enclosed by flexible sleeves. A polishing compound may be applied via openings in the body to the polishing elements; and when the tubes are inflated by a suitable inflating source, uniform pressure on each portion of the surface of revolution (which may be highly aspheric) is achieved.

Other objects as well as the advantages and features of the present invention, will of course become apparent and immediately suggest themselves to those skilled in the art to which the invention is directed from a reading of the following detailed description in connection with the accompanying drawings in which:

FIGURE 2 is a partial side view of the polishing machine of the instant invention; and FIGURE 3 is a partial top view of the machine shown in FIGURE 2.

Figure 1:
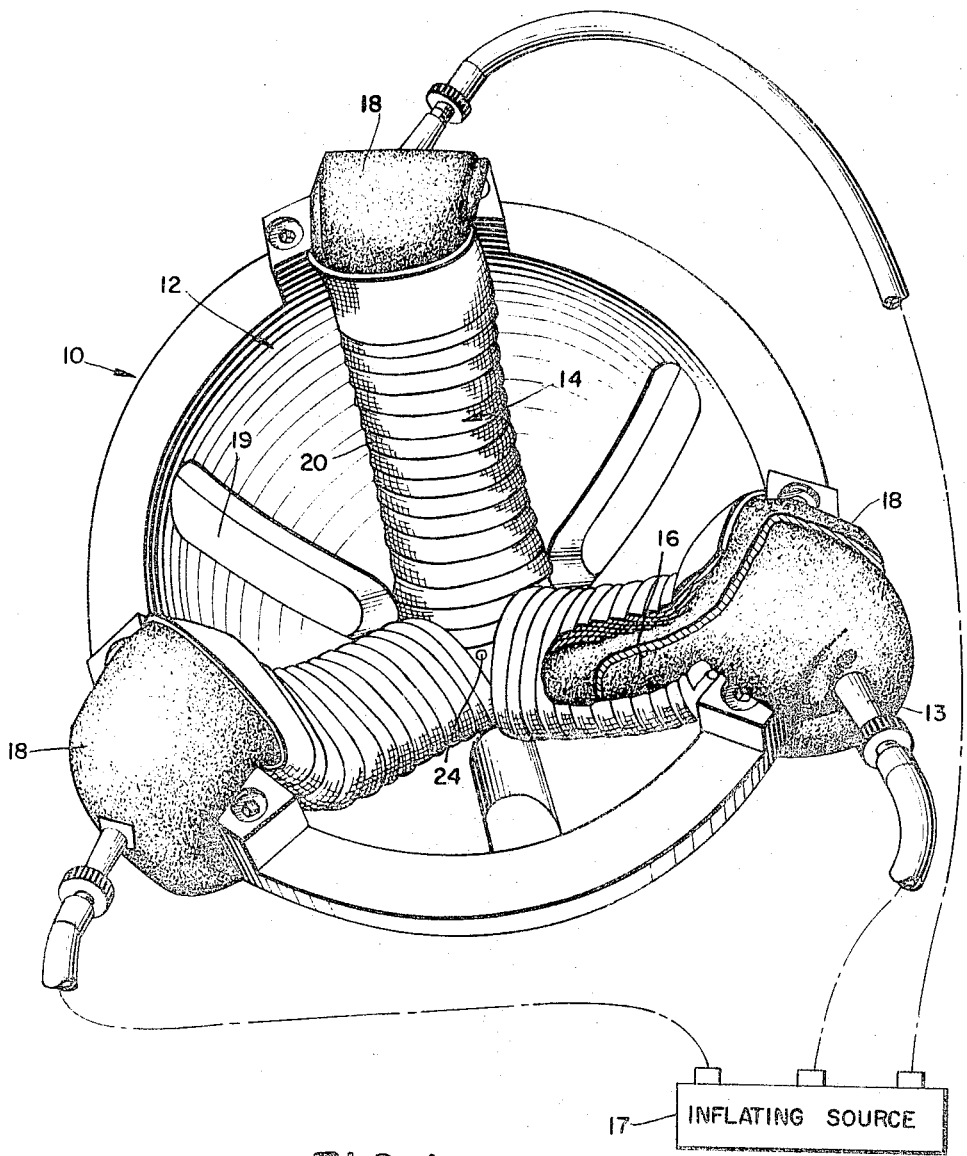
FIGURE 1 is a perspective view of the novel conforming polisher.

Referring now in detail to FIGURE 1 of the drawings and to the conforming polisher in FIGURE 2, a conforming dome-type polisher 10 which is capable of applying uniform pressure to each portion of a generally dome-shaped surface of revolution is shown. Body 12 of the polisher 10, which in the specific embodiment is generally shaped to conform to the contour of an ellipsoidal surface of revolution, has a plurality of polishing elements 14 rigidly attached to the inner periphery. This rigid attachment is achieved by the use of a plurality of rigid shoes 15 which are mounted on the outer periphery of the polisher. Each polishing element 14 includes an inflatable tube 16 which is enclosed by a flexible sleeve 18. The tube 16 has an input 13 for connection to an inflating source 17, so that the internal pressure in tube 16 may be controlled in order to achieve uniform application of pressure to each portion of the aspheric surface of revolution. In a preferred embodiment, a pneumatic inflating source may be used, however, it is obvious that any suitable inflating source, such as a hydraulic source, may be utilized. Additionally, each sleeve 18 may be wrapped by a polishing cloth 20 which is to be used in the final optical polishing process or for very fine polishing.

A suitable polishing compound 22 may either be applied to the sleeve 18 for coarse polishing or to the polishing cloth 20, if used, for final optical polishing. Of course, should coarse polishing be adequate, the sleeve 18 would not be wrapped by the polishing cloth 20. The polishing compound 22 may be applied to the surface to be polished via openings 19 in the body 12, and subsequently to the polishing element 14.

The body 12 has a vertex 24 which is connected to a polishing machine by a ball and socket arrangement as explained more fully infra. The body 12 of polisher 10 is shaped to conform generally to the curvature of that surface of revolution which is to be polished, but it is noted that the body configuration is not limited to the specific illustration of an ellipsoidal contour. Any surface of revolution (for example, a sphere, a catenoid, a paraboloid, or a hyperboloid) is within the contemplation of this invention. Should the surface of revolution have no vertex, a dummy vertex for the body 12 may be used in order to provide an accessible connection to the polishing machine. Should a sphere, cone, or cylinder be the surface of revolution, less elaborate polishing techniques would probably be utilized since uniform pressure in the polishing process is more easily achieved for such conventional configurations. However, such configurations may be used with polisher 10 and are within the scope of this invention as defined by the claims.

In the specific embodiment shown in FIGURE 1, three polishing elements 14 are used; however, more or less of these elements may be utilized depending on the particular application. Also the sleeve 18 may be made of canvas and the inflatable tube 16 may be a portion of a flexible rubber tubing such as an ordinary bicycle tire tube with the ends thereof sealed by shoes 15; however, other suitable materials may be employed and are within the scope of this invention as defined by the claims.

FIGURE 2 illustrates a partial side view of the polishing machine which provides the three modes of motion in the polishing process. An aspheric surface of revolution 30 having an axis of revolution 42 is positioned on a rotatable mandrel 32. The mandrel 32 is turned by a motor drive 34 which provides the torque needed to rotate the mandrel at a constant rate about the axis of revolution 42.

The vertex 24 of the conforming polisher 10 is connected to a shaft 36 via a ball and socket mechanism 60. The shaft 36 is rigidly connected to a revolvable plate 38 which is to be driven at a constant angular velocity by motor drive 40. It is noted that the shaft 36 is capable of relative up and down movement within the ball and socket mechanism 60. As may be seen in FIGURE 2 the axis of rotation for the plate 38 coincides with axis of revolution 42 (prescinding from the path due to a third motor drive 44, which path will be discussed later). Shaft 36 is connected near the perimeter of plate 38, and this results in an offset of a distance (d), which distance in a particular embodiment approximates the radius of the circular plate 38.

Also shown in FIGURE 2 is another motor drive 44 which provides oscillation motion. Motor drive 44 rotates a plate 48 to which is connected a shaft 46. As plate 48 rotates due to motor drive 44, shaft 46 is moved back and forth within a slot 50 of an arm 52. This causes end 56 of arm 52 to oscillate within an arc about a fixed point 41. (Fixed point 41, although shown in FIGURE 2, may be seen more clearly and will be discussed more fully in connection with FIGURE 3.) A horizontal arm 54 (shown more clearly in FIGURE 3) which extends from arm 52 is connected at its outer extremity to motor drive 40. Thus as motor drive 44 rotates the plate 48, motor drive 40 will be oscillated in an arc about fixed point 41. This mode of motion will be explained more fully in connection with FIGURE 3 below.

FIGURE 3 is a partial top view of the machine shown in FIGURE 2 and more clearly shows the third type of motion, i.e., oscillation. As stated above, the rotation of shaft 46 causes the end 56 of arm 52 to oscillate within an arc about fixed point 41. The same path, that is an arc about fixed point 41, is imparted to motor drive 40 due to the connection of motor drive 40 to horizontal arm 54. This latter arc approximates a straight line since the length of the oscillatory movement along the perimeter of the circular path having its center at point 41 is small compared to the radius of the circle, which distance approximates the length of arm 54.

Although each motor drive (34, 40 and 44) will be activated simultaneously so as to cause rotation, revolution and oscillation at the same time, the mode of operation may best be seen by considering the effect of each motor as if the other two were not operative. Motor drive 34 causes the mandrel 32 to turn on its axis 42. This results in relative rotation at a fixed rate between the aspheric surface of revolution 30 and the conforming polisher 10. Motor drive 40 causes the shaft 36 to revolve in a circular path, the center of the path being the axis of revolution 42. As may be seen in FIGURE 2, plate 38 is perpendicular to the axis of mandrel 32. It is noted that shaft 36 is movable within the ball and socket mechanism 60 so that the circular path of the vertex 24 of body 12 due to motor drive 40 may be within a curved plane. The curvature of this plane will be dependent upon the degree of curvature of the aspheric surface of revolution 30 near its vertex 31. Lastly drive means 44 causes the outer extremity 55 of horizontal arm 54 (and thus motor drive 40) to move in an arc about fixed point 41. This path approximates a straight line although more precisely the path is on an arc of a circle whose center is point 41. It is evident that, since extremity 55 is connected to motor drive 40, motor drive 40 will also move in a substantially straight line. (As a necessary corollary the axis of plate 38 and thus the center of the circular path of shaft 36 will not always coincide with the axis of revolution 42, as previously inferred, because motor drive 44 causes the whole drive 40 to move in an arc about fixed point 41.)

When the three motor drives are activated, mandrel 32 rotates the surface of revolution 30; the shaft 36 causes the vertex 24 to revolve in a circular path within a curved plane; and the rotation of shaft 46 causes the vertex 24 to oscillate back and forth in a substantially straight line.

In a particular embodiment the mandrel may be rotated at 6 r.p.m., the vertex revolved at 30 r.p.m., and the vertex oscillated at 20 cycles per minute. Also the distance (d) may be ¾ inch and ⅝ inch may be designated as the length of the arc by the design of arm 54, slot 50 and plate 48.

The three modes of motion could be realized by polishing mechanisms other than that shown in the preferred embodiment. For example, the conforming polisher could be spun about the axis of revolution so as to eliminate spinning of the mandrel. Also, the fixed point 41 could be located at point 53 on arm 52.

The advantages of this invention are numerous since the polishing techniques may be used to polish any surface of revolution. Due to the random path provided by the three modes of motion, the chances of a particularly aggressive polishing particle deeply scratching the surface to be polished are minimized. Since there is a uniform application of pressure, surface accuracy is maintained without sacrificing a high degree of optical polishing.

It is to be understood that the foregoing disclosure relates to a preferred embodiment of the invention and numerous modifications can be made without departing from the spirit and scope of the invention as described in the appended claims.

What is claimed is:

1. A polisher for an aspheric surface of revolution comprising: a body means generally shaped to conform to an aspheric surface of revolution to be polished; and a plurality of polishing means secured to the inner periphery of said body means, each polishing means including an inflatable tube means, whereby uniform pressure for polishing may be applied to each portion of an aspheric surface of revolution by inflation of said inflatable tube means.

2. A polisher as described in claim 1 wherein each polishing means further includes flexible sleeve means enclosing said inflatable tube means for utilizing a polishing compound which is to be applied to an aspheric surface of revolution to be polished.

3. A polisher as described in claim 2 wherein each polishing means further includes a polishing cloth wrapped around the outside of said flexible sleeve means for final optical polishing of an aspheric surface of revolution.

4. A polisher as described in claim 2 wherein said body means includes a plurality of openings such that a polishing compound may be applied to an aspheric surface of revolution to be polished.

5. A polisher as described in claim 1 further including an inflating source coupled to each inflatable tube means for varying the pressure within each inflatable tube means.

6. A polisher as described in claim 5 wherein said inflatable tube means consists of a flexible rubber tubing secured along the inner periphery of said body means by a plurality of rigid shoes attached to the outer periphery; wherein said flexible sleeve means consists of a canvas material; and wherein said inflating source is a pneumatic source.

References Cited

UNITED STATES PATENTS

| | | | |
|---|---|---|---|
| 1,422,505 | 7/1922 | Weaver | 51—119 |
| 2,371,303 | 3/1945 | Liebowitz | 51—57 |
| 2,747,340 | 5/1956 | Angenieux | 51—124 |
| 3,021,647 | 2/1962 | Maitenaz | 51—55 |
| 3,050,909 | 8/1962 | Rawstron | 51—124 |
| 3,142,140 | 7/1964 | Ishida | 51—55 |
| 3,149,443 | 9/1964 | Bergmann | 51—358 X |
| 3,156,073 | 11/1964 | Strasbaugh | 51—57 |
| 3,305,976 | 2/1967 | Koskie | 51—373 X |

FOREIGN PATENTS 755,354   11/1933   Germany.

ROBERT C. RIORDON, *Primary Examiner.*

J. A. MATHEWS, *Assistant Examiner.*